Patented July 4, 1944

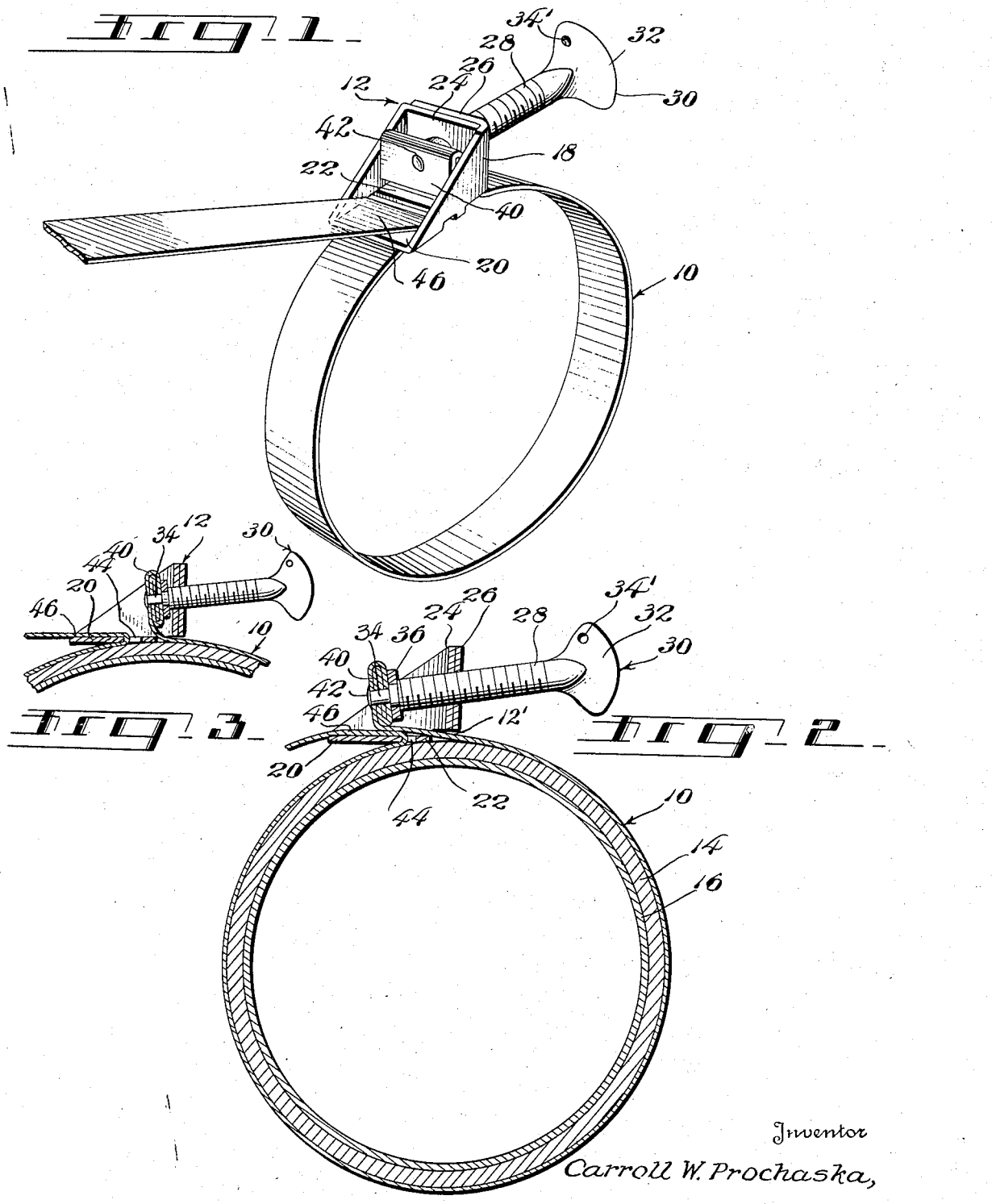

2,352,971

UNITED STATES PATENT OFFICE 2,352,971

HOSE CLAMP

Carroll W. Prochaska, Mount Vernon, N. Y.

Application April 18, 1942, Serial No. 439,578

9 Claims. (Cl. 24—19)

The present invention relates to a clamping device and more particularly to a clamping unit adapted to apply an embracing pressure to a hose or the like.

My Patent 2,218,481 discloses a hose clamp comprising a strap or other elongated gripping member in combination with a frictional holding and tensioning means acting adjacent the strap extremities for drawing the strap grippingly about the embracing member. In accordance with the aforesaid patent, this strap is reversely drawn about a gripping surface whereas the opposed portion is provided with a coacting gripping member preferably in the form of a somewhat yieldable metallic pad adapted to advance thereacross for tightening the clamp and affixing the reversely extending portion to the tensioning instrumentality.

It is an object of the present invention to improve upon the above structure by providing a clamp of the foregoing general characteristics which is adapted to facilitate tensioning of the hose or other member to be tensioned uniformly throughout its circumference or periphery and to this end there is provided a construction which facilitates advancement of the strap by the tensioning means in a novel and effective manner.

Among other objects of the invention are contemplated the provision of a device as above wherein the strap is in the vicinity of the tensioning means relieved substantially of frictional engagement with housing portions thereof and thus adapted as above to facilitate application of clamping stress; to provide a hose clamp adapted to continue and maintain the clamping stresses in the space between the strap extremities and where they join the tensioning instrumentality, thus preventing formation of a channel or wrinkle in the hose.

To provide a structure such as the foregoing wherein the tendency of the housing to tilt about a predetermined point results in increased tension of that extremity of the band which is fixed with respect to the housing; and to provide an improved housing construction whereby the total weight of the housing unit is substantially decreased without sacrifice of any of its structural characteristics.

Other and further objects will be apparent from a consideration of the drawing wherein Figure 1 is a perspective view of a hose clamp constructed in accordance with the present invention.

Figure 2 is a sectional view taken centrally through the device of Figure 1 and illustrating it in operative position upon hose assembly.

Figure 3 is a detail showing the tensioning instrumentality just prior to final application of clamping pressure.

Figures 1 to 3 of the drawing show one detailed illustrative embodiment comprising a hose clamp having a strap 10 and a tensioning unit 12. The strap 10 comprises an elongated band of flexible, preferably somewhat resilient material such as steel having uniform lateral width and capable when tensioned of being forcefully drawn about a hose such as that indicated by the reference numeral 14 in Figure 2. Interiorly of the hose 14 is disposed a tubular member 16 which, for illustrative purposes, may comprise a section of pipe about which the hose is to be clamped.

The clamping or tensioning unit 12 comprises a housing or frame having opposite side walls 18 extending upwardly in the figures and joined across the bottom by spaced wall sections 20 and 22. The rearward extremities of the vertical wall sections 18 are folded over as at 24 and 26, being overlapped and preferably secured together as by spot welding so as to constitute a relatively thick vertical wall. The double wall formed thereby is apertured and threaded to receive the shank 28 or fastener or screw 30. In the present embodiment, the screw head is of the wing type as indicated at 32, although it will be evident that any desired form of head may be utilized. An aperture 34' is provided for wiring or otherwise locking the fastener against relative rotation.

The opposite extremity of the shank 28 is provided with a portion 34 of reduced diameter bearing a thrust washer 36 and adapted to accommodate a gripping or abutment member 40 in the form of a pad or metallic unit comprising a plurality of folds or layers of the material of the band 10. While this construction is disclosed and claimed more particularly in my aforesaid patent, for purposes of completeness, attention is directed to the fact that one extremity of the band is folded over a plurality of times to provide a substantially rectangular unit having some inherent yieldability by virtue of its structure. This abutment pad or unit is apertured and received upon the projection 34 which latter is preferably headed over as at 42. Thus, the band is permanently mounted to the extremity of the screw shank in such a manner that the latter is adapted to rotate therein.

Referring now more particularly to the construction of the lower portion of the frame unit, it will be seen that the wall section 20 provides in effect a gripping or holding surface opposed to the lower marginal portion of the abutment unit 40 and across which the latter moves in its progress forwardly upon actuation of the screw. It is particularly important to note that the screw is preferably disposed upon an axis inclined slightly with respect to the holding or strap receiving section 20. Accordingly, therefore, the yieldable pad or abutment member 40 tends to approach the upper surface of the wall 20 as the screw is advanced to tension the strap. The tilted screw 28 carrying the abutment 40 combined with the horizontal wall 20, which wall is upwardly tilted by the action of the band 10 on the portion 22 of the wall, insures a constantly increasing tension of the band. Thus, when the opposite extremity of the band is passed reversely about the wall section 20 as shown in the figures, and more specifically through the relatively narrow slot or aperture 44 between the wall sections 20 and 22, the section residing above the holding surface is adapted to receive the gripping or abutment member 40 on its upper surface. In other words, the outwardly extending section 46 of the strap is disposed between the holding section 20 and the path of the gripping member 40. The wall section 22 forms a hose engaging seat terminating at its right-hand margin as viewed in the figures at a point spaced substantially inwardly from the wall sections 24 and 26. The right-hand or rearward extremity, that is, the heel of the housing is cut away or relieved as at 12' substantially at the line of junction of the vertical and horizontal walls of the housing, to provide an opening through which the band 10 passes as clearly shown in Figures 2 and 3. More specifically, the band passes above both the wall sections 20 and 22 as the fastener is advanced and enters the housing at a point above the plane of both of these wall sections.

In use, it is important to note that the housing of the tensioning section is placed upon a preferably resilient hose at any selected point and the band wrapped snugly therearound being passed through the slot 44 and thence reversely about the upper surface of the wall section 20 as shown in Figure 3. The screw is now actuated to advance the shank forwardly from the position shown in Figure 3 until it gradually reaches and, if necessary, passes beyond the position shown in Figure 2. It is to be particularly noted that advancement of the screw shank and accordingly the attached extremity of the band results in urging this portion of the band to the left and above the section 46 forming the opposite extremity of the band. Thus, not only does the yieldable abutment ride marginally along the surface of the section 46, but it prevents release of this section and holds it specifically in the position shown with respect to the housing. In the meanwhile, the material of the band being taken up by the foregoing action shortens its circumferential dimension, thus applying any desired tension.

Attention is specifically directed to the fact that there is little or no impediment to advancement of the strap extremity through the housing since there is no appreciable frictional contact between the frame or housing 12 and the relatively shiftable portions of the band. In other words, since the housing is cut away or relieved adjacent its heel portion, there is provided an aperture freely accommodating the strap in its path of movement.

It is quite significant to note that the action of the device during tightening is such as to tend to turn the frame or housing in a clockwise direction. Thus, while the parts have been shown in Figure 2 of the drawing in a relatively intermediate position, continued tightening will result in an even greater tilting of the parts, resulting from the torque set-up by virtue of the radially offset stresses imparted to the respective extremities of the strap. In short, it is to be noted that the relatively shiftable extremity of the strap adjacent the pad 40 is disposed radially outwardly of the portion 46 in accordance with the structure disclosed. Accordingly, therefore, the wall section 22 is urged strongly against the surface of the hose. Since this wall section occupies the space between the operative extremities of the band, and since the resultant gripping forces are concentrated at this point, the wall section 22 tends to prevent crimping of the flexible hose such as may normally occur in the case of many hose clamps with which I am familiar. In short, whereas the bight between the operative extremities of many hose clamps normally forms the location for an accumulation of material advanced by tensional grippage tending to impart a fold or channel and permitting appreciable relief of pressure, the present invention eliminates the possibility of failure at this point. Thus, under substantial pressure, the wall section 22 is urged forcibly toward the material of the hose and seats thereagainst causing the hose material to yield at this point.

It has been further observed that the tensioning of the band results in a corresponding tendency of the housing to creep slightly to the right as viewed in the figures, to more uniformly distribute the tensioning of the band. This effect is somewhat resisted by the interassociation of the wall section 22 with the yieldable material of the hose, whereby the shifting of the housing is limited to a predetermined degree sufficient to tension the relatively fixed extremity of the band somewhat but not to substantially dislocate the frame or housing from its original position. In other words, the present construction assures tensioning the band in a predetermined relative degree from each extremity thereof.

From the foregoing it will be appreciated that application of increased clamping stress urges the wall section 22 increasingly against the yieldable material of the hose whereby the section and particularly the right-hand portion thereof as used in the figures forms a seat supporting the housing against the tensioning force which forces it readily inwardly. While for purposes of clearly disclosing the structure this feature has not been shown to its fullest extent, it is thought it will be readily appreciated from the foregoing. Thus as the housing is increasingly urged against the material of the hose it proceeds to tilt slightly toward the right, permitting the relatively shiftable portion of the strap to extend into the housing in a plane substantially tangent to the outer surface of the hose at this point. Accordingly the relatively movable section of the strap extends into the housing substantially free from any appreciable functional contact with either the wall section 22 or the lower margin of the wall sections 24 and 26. This has been found to result in an improved tensioning efficiency over those forms wherein the strap is caused to frictionally engage the margins of the housing under substantial pressures which set up objectionable bends in the strap and impart a resistance to tightening thereof. In this connection it is extremely important to note that irrespective of the operative degree of tilting of the housing the strap does not encounter edges thereof. As tilting progresses the strap embeds itself to some extent within the yieldable surface of the hose, thus always providing sufficient clearance between the lower margins of the walls 24 and 26, causing the strap to extend freely therebeneath, substantially in the plane of the upper surfaces of wall sections 20 and 22. It will be understood that while the embodiment shown in the drawing is more or less diagrammatic, the parts will be so constructed and arranged as to provide sufficient clearance for permitting the aforesaid section of the strap to pass in a substantially straight line into the housing and across the top surface of the wall section 22.

It is furthermore important to note that the concentration of the reactionary stresses just beneath the wall section 22 results in intense compression of the hose material at this point thus resisting advancement or creepage of the hose wall toward this region under the influence of tightening forces and resisting accumulation or material crimping at this point. So, also, tilting at the aforesaid point tends to rotatably draw the fixed end of the strap increasingly about the work urging it slightly to the right so as to distribute the clamping forces uniformly about its circumferences.

The present invention provides a clamping device in which relatively great tension may be set up in a continuous band to assure permanent freedom from leakage in the hose or other instrumentality. It is further significant to note that in accordance with the present invention tendency for loosening is eliminated by virtue of the fact that the parts are in operative position subject to the yieldable and frictional effects of the gripping member 40. In short, it has been found that the characteristic engagement of the parts is such that a firm yieldable tension is applied tending to resist retrograde rotation of the fastener shank 28 and while I have disclosed means 34 adapted to receive a wire or other member which may be secured to the housing and thus positively hold the fastener against rotation, it has been found that for general purposes such a structure is unnecessary.

The tilting effect has the further advantage of permitting a more positive engagement of the extremity 46 of the strap to the housing. In normal practice the strap possesses sufficient length to embrace a wide variety of hose sizes and to permit initial application is indicated in Fig. 3. The excess material of the strap may be severed by any suitable means, leaving a short section protruding as indicated in Fig. 2. As the tilting progresses the wall section 20 lifts from the surface of the hose whereby the protruding extremity of the strap may be folded about the outer margin of the wall section 20 and caused to rest against the inner surfaces of the wall section. This additional embracing portion thus causes the end of the strap to further grip the housing providing a more positive assurance of permanence and resistance to separation. This construction further results in the advantageous elimination of sharp projecting edges.

The housing unit constructed in accordance with the present invention is particularly important in constructions adapted for aircraft engines, in view of the elimination of a considerable proportion of weight as compared with those constructions with which I have been hitherto familiar. The double rear wall formed by the wall sections 24 to 26 possesses a cross section adapted to adequately support the screw shank and resist the stresses set up when the device is tightened. The stress concentrated at this point is relieved in such a manner as to permit the use of lighter stock without impairing in any measure the structural characteristics of the device.

Obviously the invention is not limited to the specific structural arrangement disclosed herein but is capable of other modifications and changes without departing from the spirit and scope of the present invention.

What I claim is:

1. A hose clamp comprising a band, means coupled to said band at one end for tensioning the band about a hose, a housing having a vertical wall in which said tensioning means is shiftably mounted and a horizontal wall to provide a band clamping section having an aperture to receive the free end of the band to be clamped, said horizontal wall having a section adjacent said aperture against which the tensioned end of the band exerts a tilting action, the heel of the housing being cut away at the line of junction of its vertical and horizontal walls to form an aperture for straight line movement of the tensioned end of said band under the pull of said tensioning means.

2. A hose clamp comprising a band, means coupled with said band at one end for tensioning the band about a hose, a housing having a vertical wall in which said tensioning means is shiftably mounted and a horizontal wall to provide a band clamping section having an aperture to receive a free end of the band to be clamped and a section adjacent said aperture against which the tensioned end of the band exerts a tilting action, and side walls connecting said vertical and horizontal walls, the heel of the housing being cut away at the line of junction of its walls to form an aperture for straight line movement of the tensioned end of said band under the pull of said tensioning means.

3. A hose clamp comprising a band, means coupled with said band at one end for tensioning the band about a hose, a housing having a relatively thick vertical wall in which said tensioning means is shiftably mounted and a horizontal wall to provide a band clamping section having an aperture to receive a free end of the band to be clamped and a section adjacent said aperture against which the tensioned end of the band exerts a tilting action, and side walls connecting said vertical and horizontal walls, the heel of the housing being cut away at the line of junction of its walls to form an aperture for straight line movement of the tensioned end of said band under the pull of said tensioning means.

4. A hose clamp comprising a band, means coupled with said band at one end for tensioning the band about a hose, a housing having a multiply relatively thick vertical wall in which said tensioning means is shiftably mounted and a horizontal wall to provide a band clamping section having an aperture to receive a free end of the band to be clamped and a section adjacent said aperture against which the tensioned end of the band exerts a tilting action, and side walls connecting said vertical and horizontal walls, the heel of the housing being cut away at the line of junction of its walls to form an aperture for straight line movement of the tensioned end of said band under the pull of said tensioning means.

5. A hose clamp comprising a band, a tensioning screw coupled to said band at one end for tensioning the band about a hose, a housing having a vertical wall in which said tensioning screw is shiftably mounted and a horizontal wall to provide a band clamping section having an aperture to receive the free end of the band to be clamped and a section adjacent said aperture against which the tensioned end of the band exerts a tilting action, the heel of the housing being cut away at the line of junction of its vertical and horizontal walls to form an aperture for straight line movement of the tensioned end of the band under the pull of said tensioning screw.

6. A hose clamp comprising a band, a downwardly inclined tensioning screw coupled to said band at one end for tensioning the band about a hose, a housing having a vertical wall in which said tensioning screw is shiftably mounted and a horizontal wall to provide a band clamping section having an aperture to receive the free end of the band to be clamped and a section adjacent said aperture against which the tensioned end of the band exerts a tilting action, the heel of the housing being cut away at the line of junction of its vertical and horizontal walls to form an aperture for straight line movement of the tensioned end of the band under the pull of said tensioning screw.

7. A frame member for hose clamps having a vertical wall provided with an aperture for a tensioning screw, a horizontal wall adapted to support a band and having a band receiving aperture therein, said frame being cut away at the line of junction of said vertical and horizontal walls to provide an aperture for straight line movement of a band therethrough.

8. A frame member for hose clamps having a vertical wall provided with an aperture for a tensioning screw, a horizontal wall adapted to support a band and having a band receiving aperture therein, said frame being cut away at the line of junction of said vertical and horizontal walls to provide an aperture for straight line movement of a band therethrough, and side walls connecting said vertical and horizontal walls.

9. A frame member for hose clamps having a multi-ply relatively thick vertical wall provided with an aperture for a tensioning screw, a horizontal wall adapted to support a band and having a band receiving aperture therein, said frame being cut away at the line of junction of said vertical and horizontal walls to provide an aperture for straight line movement of a band therethrough, and side walls connecting said vertical and horizontal walls.

CARROLL W. PROCHASKA.